United States Patent [19]
Bernstein et al.

[11] B  3,982,231
[45] Sept. 21, 1976

[54] PREFIXING IN A MULTIPROCESSING SYSTEM

[75] Inventors: William A. Bernstein, Kingston; Robert H. Doggett, Ulster Park, both of N.Y.

[73] Assignee: International Business Machines Corporation, Armonk, N.Y.

[22] Filed: Apr. 16, 1974

[21] Appl. No.: 461,336

[44] Published under the second Trial Voluntary Protest Program on February 3, 1976 as document No. B 461,336.

Related U.S. Application Data

[63] Continuation of Ser. No. 239,894, March 31, 1972.

[52] U.S. Cl. .............................................. 340/172.5
[51] Int. Cl.[2] .......................................... G06F 1/00
[58] Field of Search ...................... 340/172.5; 445/1

[56] References Cited
UNITED STATES PATENTS

| | | | |
|---|---|---|---|
| 3,505,647 | 4/1970 | Torfeh et al. ..................... | 340/172.5 |
| 3,510,847 | 5/1970 | Carlson et al. ........................... | 445/1 |
| 3,551,892 | 12/1970 | Driscoll, Jr. ............................ | 445/1 |

OTHER PUBLICATIONS

An application–oriented multiprocessing system—IBM 9020 System, Blakeney et al.; IBM Systems Journal, Vol. 6, No. 2, 1967, pp. 80–94, Armonk, N.Y.

*Primary Examiner*—Harvey E. Springborn
*Attorney, Agent, or Firm*—Edwin Lester

[57] ABSTRACT

A shared storage multiprocessing system in which storage is arranged into blocks of storage for storing blocks of data and in which prefixed storage areas for the processors are assigned to predetermined blocks of storage in accordance with different prefix numbers having predetermined values with at least one prefixed storage area being assigned to the zero block of storage. Each of the processors includes a control register which provides the prefix number, an addressing means which provides reference block addresses and prefix logic means which selectively responds to the value of the prefix number and the values of the reference block addresses to provide storage block addresses for addressing the blocks of data in storage. When a referencing processor is to access its assigned prefixed storage area, the processor provides a reference block address equal to zero which when combined by the prefix logic means with the prefix value provided by the control register provides a storage block address equal to the block address of the prefixed storage area assigned to the referencing processor. When the referencing processor is to access the prefix storage area assigned to the zero block of storage, the processor provides a reference block address equal to the prefix value for the referencing processor which when combined by the prefix logic means with the prefix value provided by the control register provides a storage block address having a zero value equal to the block address of the prefixed storage area assigned to the zero block of storage. When the referencing processor provides a reference block address having a value which is greater than zero and not equal to the prefix number, the reference block address is passed in unaltered form by the prefix logic means as the storage block address for addressing a block of storage other than the zero block of storage or the assigned prefixed storage area of the referencing processor.

4 Claims, 3 Drawing Figures

PREFIXING IN A MULTIPROCESSING SYSTEM

This is a continuation of application Ser. No. 239,894 filed Mar. 31, 1972, now abandoned.

BACKGROUND OF THE INVENTION

This invention relates to multiprocessing systems which share a main storage and, more particularly, to a prefixing arrangement which permits each processor to selectively access blocks of data in the main storage.

Prefixing techiques have been used in multiprocessing systems as exemplified in U.S. Pat. No. 3,555,513 to E. A. Hauck et al issued Jan. 12, 1971 wherein storage address values from each processor are modified by a different constant amount so that each processor accesses an assigned portion of storage. Address limit control means are provided to prevent each processor from accessing the storage area assigned to the other processor. However, with the advent or more sophisticated multiprocessing systems and to provide more efficient utilization of main storage, it is necessary to not only commonly share storage but to also permit each processor to gain access to those portions of storage assigned to other processors in the system. Thus, in present day multiprocessing systems, main storage may be divided into areas which contain data and programs which are unique and private to each processor associated with the system and other areas which contain data which are common to all the processors of the system. Each unique area may be designated as a prefixed storage area (PSA) and may contain data and programs which are unique and private to that processor. The type of information contained in a PSA may include program and channel status words, a timer, interruption indicators, hardware diagnostic logouts, a private working storage area, temporary storage of general registers, interprocessor communication routines, error recovery routines, etc. Such a storage area may, for example, occupy 4096 (4K) bytes of storage and be assigned to a predetermined block of storage such as the first 4096 storage locations. For interprocessor communications and to minimize operator action, it is desirable, unlike the prior art system of the Hauck et al patent, to permit the active processor to have access to all blocks of storage including its own PSA and the PSA's assigned to the other processors in the system. Also, for efficient operation, it is desirable to have each processor provide the same reference block when the processor is to access its associated PSA which address is then relocated or not in accordance with the prefix number associated with the respective processor.

One arrangement that has been used for handling a shared storage dual processor system is the IBM System/360 Time Sharing System embodied in the IBM System/360 Model 67. In that system, each processor is assigned a unique 4K block of shared storage for its PSA. This is accomplished by assigning a different prefix value to each processor. Accordingly, each processor references its own PSA as storage locations 0 to 4K and the unique prefix value is directly added to the storage reference value thereby relocating the storage reference to the assigned PSA block. Each processor also references the PSA of the other processor by directly referencing the storage locations assigned to the PSA of the other processor. Thus, with this arrangement, the PSA block of each processor is indirectly referenced by forward prefixing the addresses in the 0 to 4K range and the PSA block of the other processor is directly referenced by its actual storage addresses. However, with this arrangement, the prefix values are not changeable other than by a hardwire change and storage locations 0 to 4K cannot be used since all references to those locations are relocated. Another arrangement that has been used for handling a shared storage dual processor system is the IBM System/360 Model 65 Multiprocessing System. In that system, only one of the two processors is assigned a prefix value, allowing storage locations 0 to 4K to be assigned to the non-prefixed processor. With this arrangement, the non-prefixed processor references its own PSA as storage locations 0 to 4K and the other processor's PSA as storage locations T-4K to T, where T represents the highest storage address in the system. On the other hand, the prefixed processor also logically references its own PSA as storage locations 0 to 4K but these references are relocated to the assigned PSA at storage locations T-4K to T. The prefixed processor also references to other processor's PSA as storage locations T-4K to T, but, in this case, the prefix value is subtracted by the storage reference value to relocate the storage references to storage locations 0 to 4K which is the PSA of the non-prefixed processor. Thus, with this arrangement, the prefixed processor uses a forward prefixing arrangement for accessing its own PSA and a reverse prefixing arrangement for accessing the PSA of the non-prefixed processor. Also, however, with this arrangement, one processor must always use storage locations 0 to 4K as its PSA and the prefix value for the other processor is not changeable other than by a hardwire change.

From the above, it should be clear that there are a number of limitations to the prior art approaches and that it is desirable to obtain the advantages of these approaches and yet minimize their disadvantages.

SUMMARY OF THE INVENTION

In the present invention, a prefixing arrangement is provided for a shared storage multiprocessing system which includes a plurality of processors and an addressable storage for storing blocks of data. Each of the processors is assigned a different predetermined block of storage as a prefix storage area for storing a block of data which is unique to and associated with the respective processor. Each of the processors includes a control register, addressing means and prefix logic means. The control register contains a prefix number having a predetermined value equal to the block address of the prefixed storage area associated with respective processor. Thus, if one of the processors has the zero block of storage assigned as its prefixed storage area, the associated control register provides a prefix number having a value equal to zero. The remaining processors also include control registers which provide prefix numbers having different predetermined values which are greater than zero and corresponding to the block addresses of the prefixed storage areas associated with the respective remaining processors. The addressing means of each of the processors provides reference addresses having a reference block address portion for referencing a block of storage and a storage location portion for reference a storage location within the referenced block of storage. The prefix logic means of each of the processors is responsive to the value of the prefix number provided by the respective control register and the values of the reference block addresses provided by the respective addressing means for applying storage block addresses for referencing physical blocks of storage. The prefix logic means of the processor whose PSA is associated with the zero block of storage is effective when the reference block address has a value equal to the zero value of the prefix number associated with the respective processor to apply a storage block address having a zero value for referencing the zero block of storage, i.e., the prefix storage area of the respective processor. Similarly, the prefix logic means passes all other reference block addresses in unaltered form to directly access any other block of storage including the prefixed storage areas assigned to the other processors in the system. The prefix logic means of each of the remaining processors is effective when the reference block address provided by the respective processor has a value equal to zero for applying a storage block address having a value equal to the predetermined value of the prefix number associated with the respective processor to reference the prefixed storage area associated with the respective processor thereby providing a forward relocation of the reference block address. Each such prefix logic means is also effective when the reference block address provided by the respective processor has a value equal to the predetermined value of the associated prefix number for applying a storage block address having a value equal to zero to reference the zero block of data thereby providing a reverse relocation of the reference block address. Each such prefix logic means is additionally effective when the reference block address has values greater than zero or the value of the associated prefix number for passing the reference block address in unaltered form to directly access any other block of storage including the prefixed storage areas assigned to other processors in the system.

Accordingly, a primary object of the present invention is to provide a shared storage multiprocessing system which permits dynamic access by the processors to all storage locations.

Another object of the invention is to provide a shared storage multiprocessing system which can operate with any number of processors.

A further object of the invention is to provide a shared storage multiprocessing system in which predetermined storage references by any processor in the system may be dynamically forward or reverse relocated to another storage location.

Still another object of the present invention is to provide a shared storage multiprocessing system in which each processor contains means for monitoring all storage references and selectively relocates the storage reference in accordance with the address range being referenced.

The foregoing and other objects, features and advantages of the invention will be apparent from the following more particular description of a preferred embodiment of the invention as illustrated in the accompanying drawings.

DESCRIPTION OF THE DISCLOSED EMBODIMENTS

Figure 1:
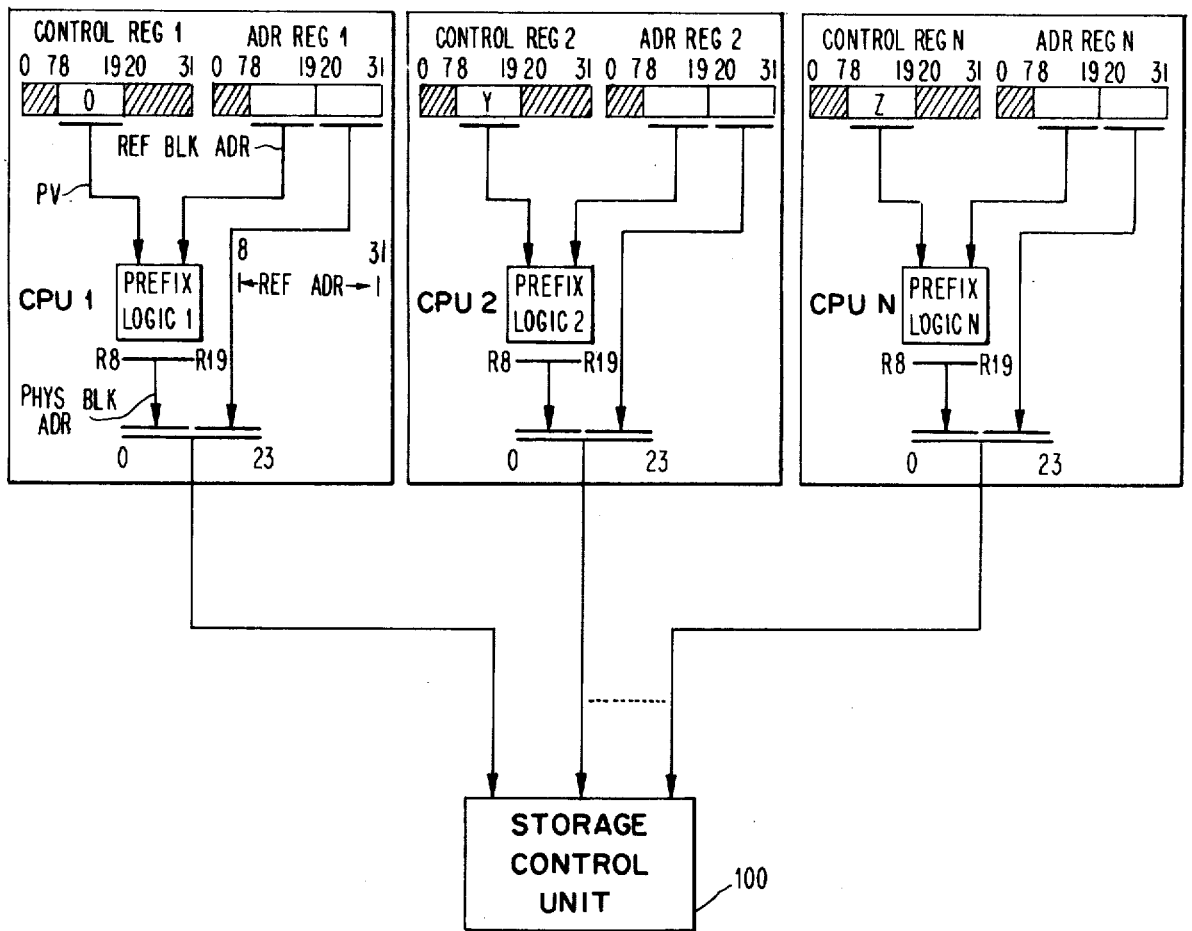
FIG. 1 is a schematic block diagram of a shared storage multiprocessisng system.
Figure 1:
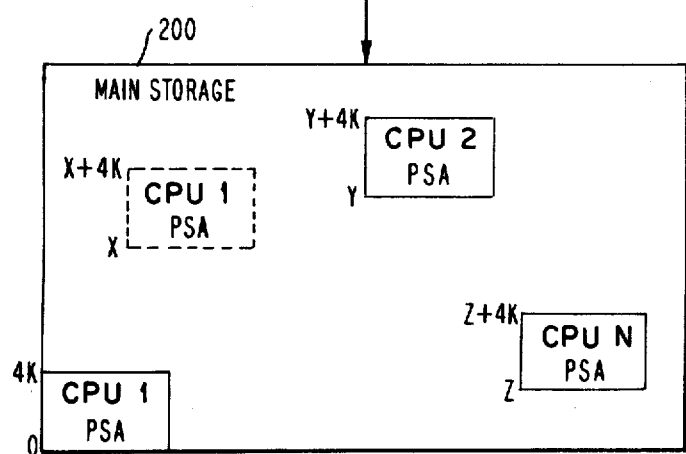

Referring now to FIG. 1, a representative shared storage multiprocessing system is shown as including processors CPU 1, CPU 2 . . . CPU N, a storage control unit 100 and a main storage unit 200. Each of the processors such as CPU 1, includes a control register such as control register 1 for storing a prefix number, value PV, an address register such as address register 1 for storing a reference address for referencing a storage location, and prefix logic means such as logic means 1 for monitoring the contents of the control register and the high order bits of the reference address. The prefix logic means provides an unchanged or a relocated high address value, termed the physical block address, which is concatenated with the low address bits of the reference address to provide the storage reference physical address to the storage control unit 100 for addressing main storage 200. Assuming a 24 bit addressing system, main storage 200 can be considered as being divided into a series of 4K blocks of storage in which the 12 high order bits of the reference address, termed the reference block address, designates the base address of a storage block and the low order 12 bits designates a storage location within the block defined by the high order bits. While a 24 bit addressing system and 4K block size are used for illustrative purposes, the invention is not limited to such an addressing system or block size but may be used with any addressing system and any block size. The prefix value PV is also a 12 bit quantity contained in the control register at bit positions corresponding to the high order bits of the reference address value. Since the prefix value is contained in a control register, the value of the prefix number can be set by an instruction from the supervisory program which designates a value to be loaded into the control register. Thus, any value may be set into the control register under control of the supervisory program. In the example shown, a prefix value of 0 is set into control register 1, a prefix value of Y is set into control register 2 and a prefix value of Z is set into control register N. Each of these values identify the base address of the block assigned to the PSA for the associated processor. Thus, the PSA for CPU 1 will be located at storage locations 0 to 4K, the PSA for CPU 2 is located at storage locations Y to Y+4K and the PSA for CPU N is located at storage locations Z to Z+4K. It is apparent that since the supervisory program may set different prefix values into the control register, these values may be dynamically changed. For example, a prefix value of 0 may be placed in control register 2 in which case the PSA area for CPU 2 would be assigned storage locations 0 to 4K and if a prefix value X is set into control register 1, then the PSA for CPU 1 would be assigned storage locations X to X+4K as shown in dotted form. While each processor is assigned a different PSA block, each processor references the zero block of main storage when access to its PSA is desired since logic means, in accordance with the prefix value in the associated control register, provides a storage block address for addressing the assigned PSA block.

Figure 2:
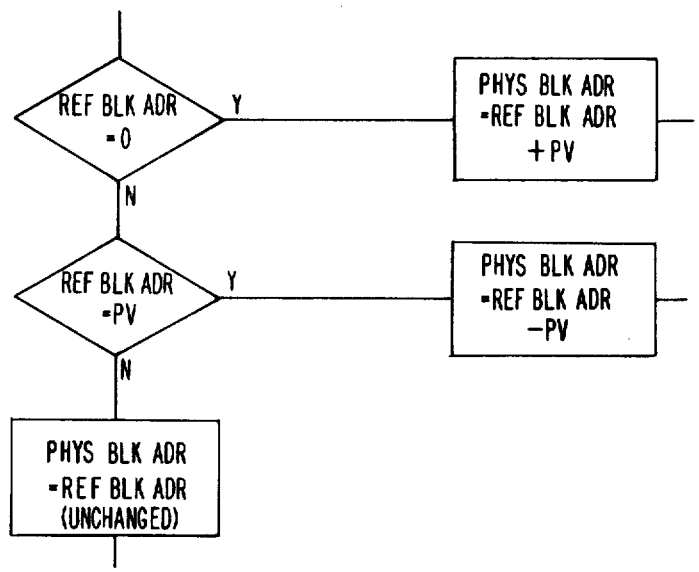
FIG. 2 is a schematic flow chart showing the logic of the prefixing algorithm.

Referring now to FIG. 2, there is shown a flow chart of the prefixing algorithm performed by the prefix logic means in each of the processor units. The prefix logic means monitors the high order bits of the reference address in the associated address register, i.e., the reference block address and the corresponding bits of the prefix value in the associated control register. If the processor is providing a reference block address equal to zero, , the prefix logic means will combine the prefix value and the reference block address to derive the block address assigned to the PSA for the associated processor. In the case of CPU 1, a prefix value of 0 is combined with the reference block address value of 0 to drive a physical block address of O so that no change is made to the reference block address value, whereas in the case of CPU 2 and CPU N, a prefix value of Y and Z, respectively, is combined with the reference block address value of 0 to relocate the base address of the respective PSA blocks for CPU 2 and CPU N to the physical block addresses of Y and Z, respectively. On the other hand, if the CPU is providing a reference block address which is identical to by the prefix value in the control register storage locations P to P+4K where P may have a value of 0, then the prefix logic means will combine the prefix value and the reference block address to derive a physical block address equal to zero which designates the zero block of storage, i.e., the PSA block assigned to one of the processors. Thus, in the case of CPU 1, a prefix value of 0 is combined with the storage reference block address value of 0 to derive a physical block address of 0 which designates the zero block of storage, i.e., the PSA block assigned to CPU, whereas in CPU 2 and CPU N, when the reference block address value in the address register is identical to the prefix value in the control register the prefix logic means effectively combines the prefix value and the reference block address value to derive a physical block address of 0 which designates the zero block of storage, i.e., the PSA block to CPU 1. If the reference block address value is greater than zero and not equal to the prefix value then the prefix logic means will provide a physical block address which is unchanged from the reference block address. This prefixing algorithm is applicable to all the processors in the system with CPU 2 and CPU N representing the more general case and CPU 1 a specific case. Thus, it is apparent in the more general case, as for example with respect to CPU 2, when the processor is to reference its own PSA the processor provides a reference block address equal to zero. Accordingly, the reference block address value 0 is forward prefixed in the prefix logic means by the prefix value Y to provide a physical block address equal to Y designating the PSA block assigned to CPU 2. When CPU 2 must access the PSA block for CPU 1, the processor provides a reference block address equal to the prefix value Y. Consequently, the reference block address value Y is reverse prefixed in the prefix logic means by the prefix value Y to provide a physical block address equal to 0 designating the 0 block of storage which is the PSA block for CPU 1. Additionally, when CPU 2 must access any other block of storage including the PSA block for CPU N, the associated prefix logic means will pass all such references without any alteration of the reference block address thereby permitting direct access to such blocks of storage. CPU N will operate in a similar manner to that described with respect to CPU 2.

Figure 3:
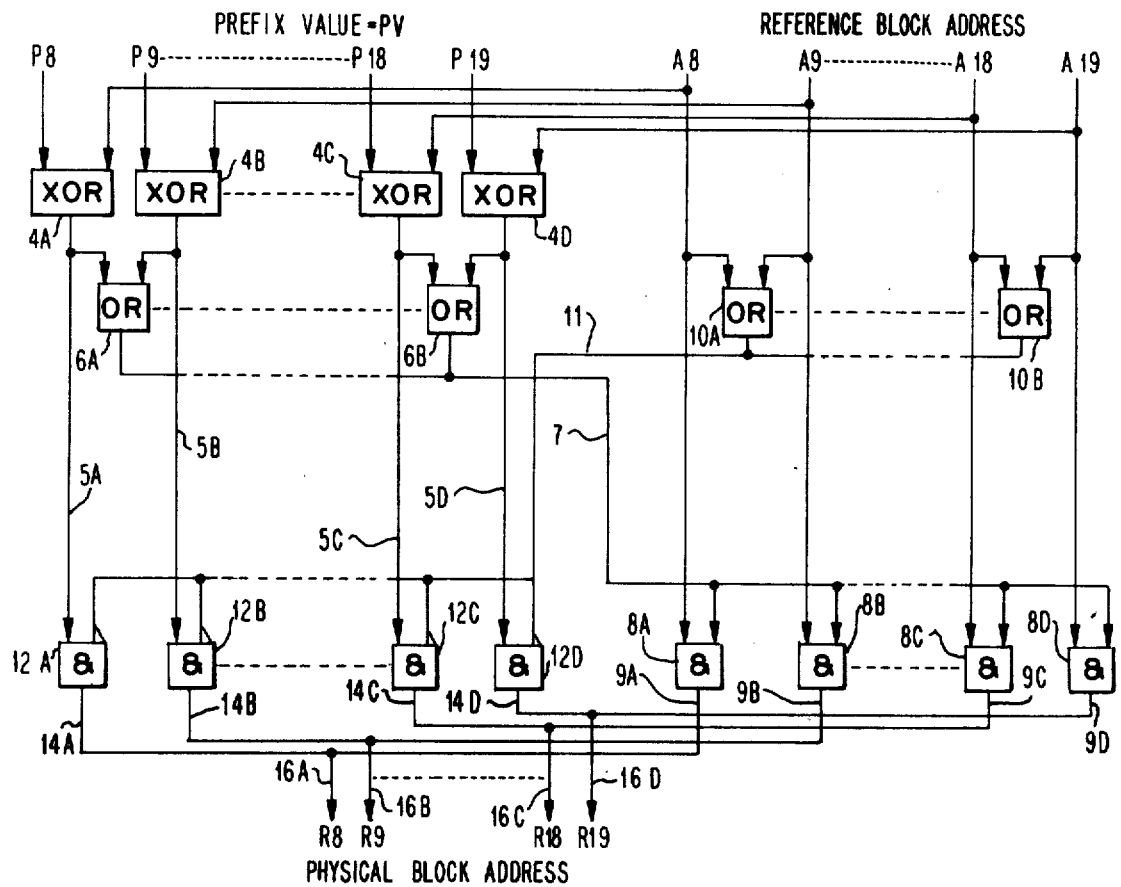
FIG. 3 is a schematic block diagram of the prefix logic means shown in FIG. 1.

Referring now to FIG. 3, there is shown a schematic block diagram of a representative prefix logic means used with any of the processors of the system. The prefix logic means includes a compare circuit consisting of a plurality of exclusive OR circuits 4 and OR circuits 6. The exclusive OR circuits 4 compare the high order bits of the logical reference address i.e., the reference block address on bit lines A8 to A19 with the corresponding bits of the prefix value on bit lines P8 to P19. The outputs of the exclusive OR circuits 4 are connected in pairs to the OR circuits 6, as for example, the outputs of exclusive OR circuits 4A and 4B are connected to the inputs of OR circuit 6A. Additionally, the outputs of the exclusive OR circuits 4 are connected via lines 5 to corresponding inputs of the AND gates 12. The outputs of the OR circuits 6 are dot ORed to provide a compare (negative signal) or no-compare (positive signal) on line 7 to selectively condition the AND circuits 8. A negative signal on line 7, indicating a compare condition is detected between the high order bits of the reference address and the corresponding bits of the prefix value, will decondition AND circuits 8 to block the transfer of the reference block address on the bit lines A to the output lines 9 and force a zero address (all negative signals) to be applied to output lines 9. A positive signal on line 7, indicating a no-compare condition is detected, will condition AND circuits 8 to transfer the reference block address on bit lines A to the output lines 9. The high order bits of the reference address are also applied to a Zero detector consisting of OR circuits 10, the outputs of which are dot ORed to provide a zero detect (negative signal) or no-zero detect (positive signal) on line 11 to selectively condition the AND circuits 12. The wedge at the input terminals of AND circuits 12 indicates that a negative signal must be applied to that input terminal when a positive signal is applied to the other input terminal in order to satisfy the AND function. A positive signal on line 11, indicating a reference block address other than zero, if detected, will decondition AND circuits 12 to force a zero address (all negative signals) to be applied to output lines 14. Corresponding output lines of the AND circuits 8 and 12 are dot ORed to the output address lines 16, as for example, output line 9A and output line 14A are dot ORed to address line 16A, etc. The signals on address lines 16 are applied via resultant address bit lines R8 to R19 as the high order portion of the physical address for the block being referenced by the associated processor. While detailed circuitry has not been shown relative to bit lines 10 to 17, it is apparent that circuitry for these intermediate stages of the prefix logic means is similar to that shown for bits 8, 9, 18 and 19.

The operation of the prefix logic means will be described for three cases: (1) where the processor provides a reference address equal to zero, (2) where the processor provides a reference block address equal to the prefix value and (3) where the processor provides a reference block address which is greater than zero and not equal to the prefix value.

Referring now to the first case, let it be assumed that CPU 2 is applying a reference block address value =00...00 to the address bit lines A8 to A19 and that a prefix value Y=11...01 is being applied to the prefix bit lines P8 to P19, respectively. Further, let it be assumed that a 1 bit signal provides a positive signal and that a 0 bit provides a negative signal. Accordingly, for the example indicated, negative signals are applied via the address bit lines A8 to A19 to the inputs of the zero detect OR circuits 10 and to one input of each of the exclusive OR circuits 4A. The OR circuits 10 in response to the negative signals on the address bit lines A produce negative signal outputs which are dot ORed to apply a negative signal, indicating a zero detection, via line 11 to condition the AND circuits 12. Since bit positions P8, P9 and P19 of the prefix value are different from the bit positions A8, A9 and A19 of the reference block address, exclusive OR circuits 4A, 4B and 4D will apply positive signal via lines 5A, 5B and 5D to the corresponding AND circuits 12A, 12B and 12D. On the other hand, bit position P18 of the prefix value is identical to bit position A18 of the reference block address so that exclusive OR circuit 4C applies a negative signal via line 5C to the corresponding AND circuit 12C. Accordingly, the bit pattern for the prefix value is transferred to the AND gates 12 which being conditioned pass the prefix value to the output lines 14. OR circuit 6A senses the positive signal outputs of the exclusive OR circuits 4A and 4B to apply a positive signal via the dot OR output line 7 to condition the AND circuits 8. However, since the high order bits of the reference block address are all 0's, negative signals are applied to degate all of the AND circuits 8 which, accordingly, provide negative signals to the output lines 9. The negative signals on output lines 9 are dot ORed with the prefix value on output lines 14 thereby providing the prefix value pattern to the resultant address bit lines R8 to R19. Thus, the function of the prefix logic means when the processor provides a reference block address equal to zero block of storage is to detect this condition and relocate the storage block reference to the block identified by the prefix value, namely, the PSA assigned to the referencing processor. The prefix logic means of CPU N operates in a similar manner to that described above for the prefix logic means of CPU 2. Thus, when CPU N provides a reference block address equal to the zero block of storage, it provides an address value of 00...00 to the address bit lines A8 to A19 which condition is detected by the zero detector of prefix logic means N to cause the prefix value Z to be transferred to the resultant address bit lines R8 to R19. The prefix logic means of CPU 1 represents the special condition where the PSA block assigned to CPU 1 corresponds to the zero block of storage. However, the same prefixing algorithm is applicable as in the previous case, namely, when the CPU provides a reference block address equal to zero this condition is detected by the zero detector in the prefix logic means 1 to cause the prefix value 0 to be transferred to the resultant address bit lines R8 to R19. Thus, it should be apparent from the above that any processor in the system which provides a reference block address equal to zero will have that condition detected by the associated prefix logic means to provide a physical block address whose value is equal to the prefix value associated with the respective processor.

Referring now to the second case identified above, let it be assumed that CPU 2 is providing a reference block address equal to the prefix value Y = 11...01. The reference block address is applied to the address bit lines A8 to A19. Accordingly, since the reference block address value is other than 00...00, the zero detector consisting of OR circuits 10 will produce a no-zero detect positive signal on line 11 to decondition the AND circuits 12. As a result, AND circuits 12 apply negative signals to the output lines 14 regardless of the output signal pattern form the exclusive OR circuits 4. Since the reference block address value applied to the address bit lines A8 to A19 is equal to the prefix value applied to the prefix bit lines P8 to P19 for the assumed example, exclusive OR circuits 4 detect this condition and apply all negative signals to the output lines 5. The OR circuits 6, in response to the negative signals on output lines 5, produce negative signal outputs which are dot ORed to apply a negative compare signal via line 7 to decondition the AND circuits 8. As a result, AND circuits 8 apply negative signals to the output lines 9 regardless of the address value pattern being applied thereto from the address bit lines A8 to A19. The negative signals on output lines 9 are dot ORed with the negative signals on output lines 14 to apply all negative signals, representing an address value of 00...00, via the address lines 16 to the resultant address bit lines R8 to R19. Thus, the function of the prefix logic means when the processor provides a reference block address value equal to the prefix value is to detect this condition and reversely relocate the reference block address to the zero block of storage which is the PSA associated with CPU 1. The prefix logic means of CPU N operates in a similar manner to that described above for the prefix logic means of CPU 2. Accordingly, when CPU N to the prefix value Z, this condition is detected by the exclusive OR compare circuit in the prefix logic means to cause a zero address value to be applied to the resultant address bit lines R8 to R19, thereby reversely relocating the block reference to the zero block of storage which is the PSA associated with CPU 1. The prefix logic means of CPU 1 again represents the special condition where the PSA block assigned to CPU 1 corresponds to the zero block of storage. However, the same prefixing algorithm is applicable as in the previous cases, namely, when the CPU provides a reference block address equal to the prefix value, this condition is detected by the exclusive OR compare circuit of the prefix logic means to cause a zero address value to be applied to the resultant address bit lines R8 to R19. Thus, it should be apparent from the above that any processor in the system which provides a reference block address equal to the prefix value will have that condition detected by the associated prefix logic means to provide a physical block address whose value is equal to zero designating the zero block of storage.

Referring now to the third case identified above, let it be assumed that CPU 2 is providing a block reference address having a value which is greater than zero and not equal to the assigned prefix value. Accordingly, the zero detector OR circuits 10 will provide a no-zero detect positive signal via line 11 to decondition the AND circuits 12. As a result, AND circuits 12 apply negative signals to the output lines 14 regardless of the output signal pattern from the exclusive OR circuits 4. Also, since the address value applied to the address bit lines A8 to A19 is not equal to the prefix value applied to the prefix bit lines P8 to P19, exclusive OR circuits 4 detect this condition causing OR circuits 6 to apply a no-compare positive signal via line 7 to condition AND circuits 8. The AND circuits 8 are, therefore, effective to pass the address value pattern on the address bit lines A8 to A19 to the output lines 9. The address value pattern on output lines 9 are dot ORed with the negative signals on output lines 14 to apply the address value pattern via the address lines 16 to the resultant address bit lines R8 to R19. Thus, the function of the prefix logic means when the processor provides a reference block address having a value which is greater than zero and not equal to the prefix value is to pass the applied address value unchanged to the resultant address bit lines. The prefix logic means of CPU 1 and CPU N operate in a similar manner to that described above for the prefix logic means of CPU 2. Accordingly, in each case, the zero detector OR circuits 10 detect a no-zero address value causing a no-zero detect positive signal to be applied via line 11 to decondition the AND circuits 12 and maintain negative signals on the output lines 14. Also, since the address and prefix values are unequal, exclusive OR circuits 4 detect this condition causing OR circuits 6 to apply a no-compare positive signal via line 7 to condition AND circuits 8 to pass the address value unchanged to the resultant address bit lines R8 to R19.

It should be apparent from the above that with the prefixing arrangement of the present invention, all processor references to the zero block of storage will be directed to the assigned PSA block in accordance with the associated prefix value, all processor references to the assigned PSA block will be directed to the zero block of storage and all processor references to a block other than the zero block of storage and the assigned PSA block will pass unaltered through the prefix logic means.

While the invention has been particularly shown and described with reference to a preferred embodiment thereof, it will be understood by those skilled in the art that various changes in form and detail may be made therein without departing from the spirit and scope of the invention.

What is claimed is:

1. In a shared storage multiprocessing system that includes a plurality of processors and an addressable storage arranged into blocks of storage for storing blocks of data, a method by which each of said processors may access all of said blocks of data comprising the steps of:
    providing a prefix number for one of said processors having a zero value which is equal to the block address of a prefixed storage area consisting of a block of storage assigned to said one processor,
    providing reference block addresses for said one processor,
    detecting the zero value of said prefix number and the values of said reference block addresses provided for said one processor,
    providing storage block addresses for said one processor for accessing all of said blocks of data in accordance with the detected values including:
    a storage block address having a value which is equal to the zero value of the prefix number provided for said one processor for accessing the block of data in the prefixed storage area assigned to said one processor when the reference block address having a value which is equal to zero is detected, and
    other storage block addresses having values which are equal to the reference block addresses provided for said one processor for accessing blocks of data other than the block of data contained in the prefixed storage area assigned to said one processor when reference block addresses having values which are greater than zero are detected,
    providing prefix numbers for the remaining processors having different predetermined values which are greater than zero and equal to the block addresses of different prefixed storage areas consisting of blocks of storage assigned to said remaining processors,
    providing reference block addresses for each of said remaining processors,
    detecting the predetermined value of the prefix number and the values of the reference block addresses provided for each of said remaining processors, and
    providing storage block addresses for each of said remaining processors for accessing all of said blocks of data in accordance with the detected values including:
    a first storage block address having a value which is equal to the predetermined value of the prefix number provided for said remaining processor for accessing the block of data in the prefixed storage area assigned to said remaining processor when the reference block address having a value which is equal to zero is detected,
    a second storage block address having a value which is equal to zero for accessing the block of data in the prefixed storage area assigned to said one processor when the reference block address having a value which is equal to the predetermined value of the prefix number provided for said remaining processor is detected, and
    other storage block addresses having values which are equal to the reference block addresses provided for said remaining processor for accessing blocks of data other than the blocks of data in the prefixed storage areas assigned to said one processor and said remaining processor when reference block addresses having values which are greater than zero and not equal to the predetermined value of the prefix number provided for said remaining processor are detected.

2. In a shared storage multiprocessing system that includes a plurality of processors and an addressable storage arranged into blocks of storage for storing blocks of data with one of said blocks of storage located at a block address having a value which is equal to zero being assigned as a prefixed storage area for one of said processors and other blocks of storage located at block addresses having different predetermined values which are greater than zero being assigned as different prefixed storage areas for the remaining processors, a method by which each of said processors may access the blocks of data in all of said prefixed storage areas comprising the steps of:
    providing a prefix number for each of said processors having a predetermined value which is equal to the block address of the assigned prefixed storage area,
    providing reference block addresses for said one of said processors including a reference block address having a value which is equal to zero when the block of data in the prefixed storage area assigned to said one of said processors is to be accessed and reference block addresses having values equal to the predetermined values of the prefix numbers assigned to said remaining processors when the blocks of data in the prefixed storage areas assigned to said remaining processors are to be accessed,
    providing reference block addresses for each of said remaining processors including a reference block address having a value which is equal to zero when the block of data in the prefixed storage area assigned to a referencing processor is to be accessed, a reference block address having a value which is equal to the predetermined value of the prefix number assigned to the referencing processor when the block of data in the prefixed storage area assigned to said one of said processors is to be accessed and reference block addresses having values equal to the predetermined values of the prefix numbers assigned to said remaining processors when the blocks of data in the prefixed storage areas assigned to said remaining processors are to be accessed, detecting the value of said prefix number and the values of said reference block addresses provided for each of said processors, providing storage block addresses for said one of said processors for accessing the blocks of data in all of said prefixed storage areas assigned to said processors in accordance with the detected values including a storage block address for accessing the block of data in the prefixed storage area assigned to said one of said processors when a reference block addresss having a value which is equal to zero is detected and storage block addresses for accessing the blocks of data in the prefixed storage areas assigned to said remaining processors when reference block addresses having values which are equal to the predetermined values of the prefix numbers assigned to said remaining processors are detected, and providing storage block addresses for each of said remaining processors for accessing the blocks of data in all of said prefixed storage areas assigned to said processors in accordance with the detected values including a storage block address for accessing the block of data in the prefixed storage area assigned to a referencing processor when a reference block address having a value which is equal to zero is detected, a storage block address for accessing the block of data in the prefixed storage area assigned to said one of said processors when a reference block address having a value which is equal to the predetermined value of the prefix number assigned to the referencing processor is detected and storage block addresses for accessing the blocks of data in the prefixed storage areas assigned to said remaining processors when reference block addresses having values which are equal to the predetermined values of the prefix numbers assigned to said remaining processors are detected.

3. A shared storage multiprocessing system comprising:

a plurality of processors, and an addressable storage arranged into blocks of storage for storing blocks of data, one processor of said plurality of processors including:

a control register producing a signal representing a first prefix number having a zero value which is equal to the block address of a prefixed storage area consisting of a block of storage assigned to said one processor, an addressing means producing reference block address signals including a first signal representing a reference block address having a value which is equal to zero and second signals representing reference block addresses having different values which are greater than zero, and control means responsive to said first prefix number signal and said first and second reference block address signals for applying a signal representing a storage block address having a value which is equal to zero to access the block of data in the prefixed storage area assigned to said one processor when responding to said first reference block address signal and for applying signals representing storage block addresses having different values which are greater than zero to access blocks of data in said blocks of storage other than the block of data in the prefixed storage area assigned to said one processor when responding to said second reference block address signals, each of the remaining ones of said plurality of processors including:

a control register producing a signal representing a second prefix number having a predetermined value which is greater than zero and equal to the block address of a prefixed storage area consisting of a block of storage assigned to said remaining processor, an addressing means producing reference block address signals including a third signal representing a reference block address having a value which is equal to zero, a fourth signal representing a reference block address having a value which is equal to the predetermined value of said second prefix number and fifth signals representing reference block addresses having different values which are greater than zero and not equal to the predetermined value of said second prefix number, and control means responsive to said second prefix number signal and said third, fourth and fifth reference block address signals for applying a signal representing a storage block address having a value which is equal to the predetermined value of said second prefix number to access the block of data in the prefixed storage area assigned to said remaining processor when responding to said third reference block address signal, for applying a signal representing a storage block address having a value which is equal to zero to access the block of data in the prefixed storage area assigned to said one processor when responding to said fourth reference block address signal and for applying signals representing storage block addresses having different values which are greater than zero and not equal to the predetermined value of said second prefix number to access blocks of data in said blocks of storage other than the blocks of data in the prefixed storage areas assigned to said remaining processor and said one processor when responding to said fifth reference block address signals.

4. A shared storage multiprocessing system comprising:

a first processor, a second processor, and an addressable storage arranged into blocks of storage for storing blocks of data, said first processor including a control register producing a signal representing a first prefix number having a zero value which is equal to the block address of a prefixed storage area consisting of a block of storage assigned to said first processor, said second processor including a control register producing a signal representing a second prefix number having a predetermined value which is greater than zero and which is equal to the block address of a prefixed storage area consisting of a block of storage assigned to said second processor, said first processor including a first addressing means producing reference block address signals including a first signal representing a reference block address having a value which is equal to zero and a second signal representing a reference block address having a value which is equal to the predetermined value of said second prefix number, said second processor including a second addressing means producing reference block address signals including a third signal representing a reference block address having a value which is equal to zero and a fourth signal representing a reference block address having a value which is equal to the predetermined value of said second prefix number, said first processor including a control means responsive to said first prefix number signal and said first and second reference block address signals for applying a signal representing a storage block address having a value which is equal to zero to access the block of data in the prefixed storage area assigned to said first processor when responding to said first reference block address signal and for applying a signal representing a storage block address having a value which is equal to the predetermined value of said second prefix number to access the block of data in the prefixed storage area assigned to said second processor when responding to said second reference block address signal, and said second processor including a control means responsive to said second prefix number signal and said third and fourth reference block address signals for applying a signal representing a storage block address having a value which is equal to the predetermined value of said second prefix number to access the block of data in the prefixed storage area assigned to said second processor when responding to said third reference block address signal and for applying a signal representing a storage block address having a value which is equal to zero to access the block of data in the prefixed storage area assigned to said first processor when responding to said fourth reference block address signal.

* * * * *